United States Patent
Riegert et al.

(12) 
(10) Patent No.: US 6,287,531 B1
(45) Date of Patent: *Sep. 11, 2001

(54) PREPARATION OF HYDROGEN CYANIDE

(75) Inventors: Ronald Jack Riegert, Newark; Mehrdad Mehdizadeh, Wilmington, both of DE (US)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/693,728

(22) Filed: Aug. 7, 1996

Related U.S. Application Data

(63) Continuation of application No. 08/189,471, filed on Feb. 1, 1994, now abandoned.

(51) Int. Cl.⁷ .................................................. C01C 3/02
(52) U.S. Cl. ........................................ 423/376; 204/157.46
(58) Field of Search ........................ 423/376; 204/157.46

(56) References Cited

U.S. PATENT DOCUMENTS

| | | | |
|---|---|---|---|
| 1,986,348 | 1/1935 | Lacy et al. | 423/376 |
| 4,743,522 | 5/1988 | Iino et al. | 430/58 |
| 5,110,996 | 5/1992 | Edwards | 570/159 |
| 5,262,145 | 11/1993 | Agrawal et al. | 423/376 |
| 5,470,541 | * 11/1995 | Koch et al. | 422/186 |

FOREIGN PATENT DOCUMENTS

| | | | |
|---|---|---|---|
| 588268 | 12/1959 | (CA) | 423/376 |
| 2.014.523 | 4/1970 | (FR) | 423/376 |
| 2 210 286 A | 6/1988 | (GB) . | |

* cited by examiner

*Primary Examiner*—Stuart L. Hendrickson

(57) ABSTRACT

Hydrogen cyanide is produced by reacting ammonia and a hydrocarbon gas in the presence of a platinum-group-metal catalyst while the catalyst is heated by induction heating at a frequency of 0.5 to 30 MHz.

4 Claims, 1 Drawing Sheet

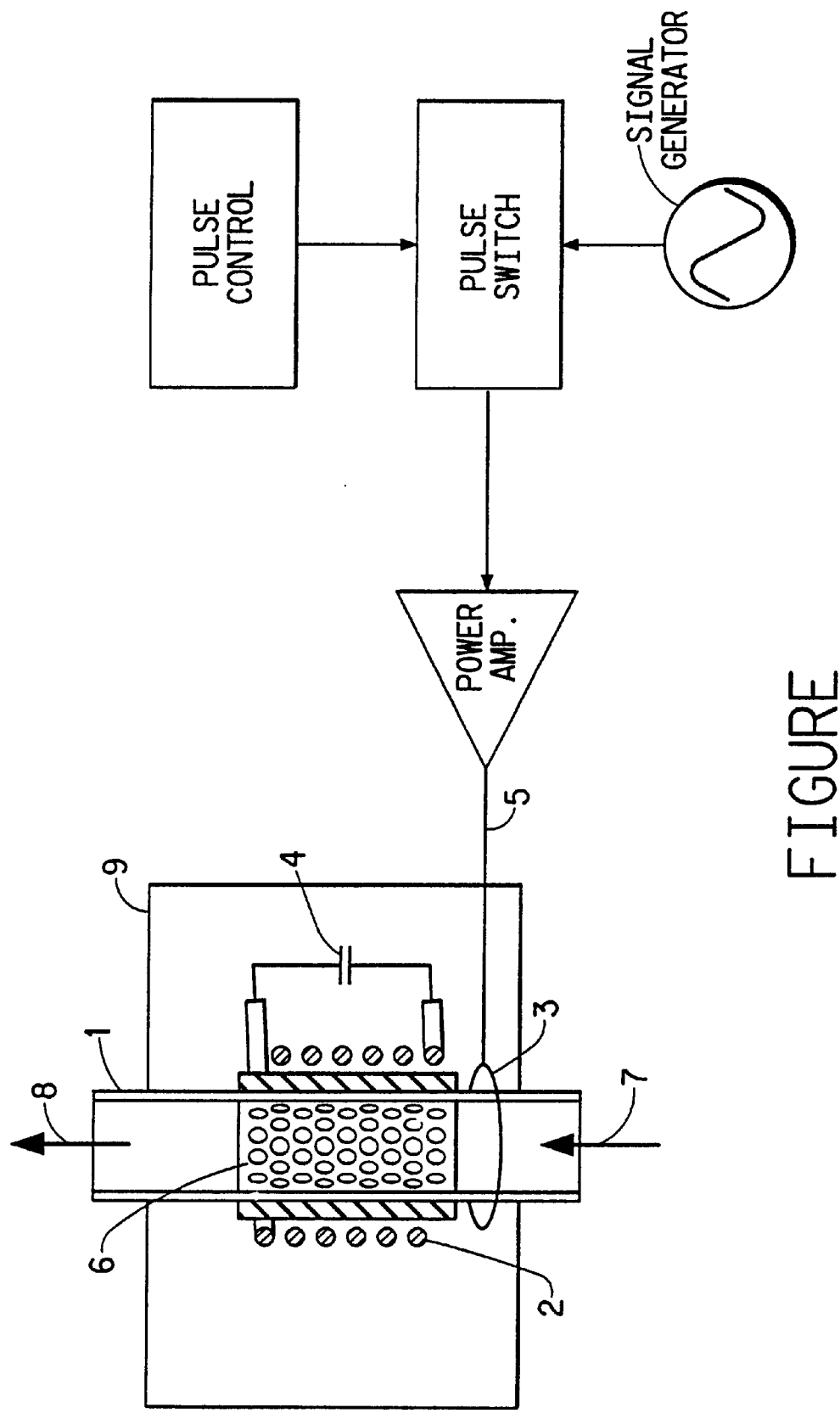
FIGURE

PREPARATION OF HYDROGEN CYANIDE

This is a continuation of application Ser. No. 08/189,471, filed Feb. 1, 1994 now abandoned.

FIELD OF THE INVENTION

This invention relates to the preparation of hydrogen cyanide (HCN) by reacting ammonia and a hydrocarbon gas in the presence of a platinum-group-metal catalyst while heating the catalyst by induction heating at a frequency of 0.5 to 30 MHz.

BACKGROUND OF THE INVENTION

Hydrogen cyanide is highly toxic, but a commercially important chemical compound having a wide variety of industrial uses. Hydrogen cyanide is produced commercially by contacting ammonia, excess hydrocarbon gas, and an oxidizing gas with a platinum-group-metal catalyst. The excess hydrocarbon gas is ignited, and the heat generated is sufficient to cause the endothermic reaction of ammonia and the remaining hydrocarbon gas to form hydrogen cyanide.

Shipment of hydrogen cyanide presents potential hazards. One way to avoid these potential hazards is to produce the product at the site where it is to be used. However this requires the installation of a large number of small production facilities. Such production facilities have in the past been expensive.

It is an objective of the present invention to provide a process for the production of HCN that can be operated on a relatively small scale but efficiently and at a low installation cost.

The present invention employs the use of induction heating of a platinum-group-metal catalyst to cause ammonia to react with hydrocarbon gas and form hydrogen cyanide. The reaction is endothermic, and by the use of induction heating the amount of energy used may be carefully regulated so that a minimum of energy is wasted.

The use of induction heating to heat catalyst to cause chemical reactions of various types is known; for example in Edward's U.S. Pat. No. 5,110,996 vinylidine fluoride is produced by the reaction of dichlorofluoromethane with methane, and the reaction tube contains a non-metallic packing material, and optionally a metallic catalyst—see column 3 line 5. Conventionally induction heating is carried out at frequencies of about 0.1 to 0.2 MHz.

SUMMARY OF THE INVENTION

The present invention is a process for the preparation of hydrogen cyanide which comprises heating a platinum-group-metal catalyst by induction heating at a frequency of 0.5 to 30 MHz to reaction temperature, passing a mixture of ammonia vapor and a hydrocarbon gas in contact with said heated catalyst, and recovering hydrogen cyanide. A preferred hydrocarbon gas is methane, but other hydrocarbon gases are also useful, for example hydrocarbon gases having 1 to 6 carbon atoms and mixtures of such gases. A preferably the mole ratio of ammonia to carbon atoms in the hydrocarbon gas is approximately 1. A preferred form of catalyst is a metal gauze. The preferred platinum-group-metal catalyst is platinum; however, mixtures of platinum-group-metals may also be employed. The platinum-group-metal catalyst may also be a metal gauze containing a platinum-group metal, or the metal gauze may be made of platinum-group metal. The catalyst may also be a ceramic substrate having a platinum-group-metal dispersed on its surface, for example the reactor tube or tubes may be ceramic and coated with a platinum-group-metal, or the catalyst may be ceramic particles coated with platinum-group-metal. The catalyst should have an electrical conductivity of at least about 1.0 Seimens per meter in order to be effectively heated by electrical induction. The process of the invention is carried out at a the reaction temperature of between about 600 and about 1200 degrees C.

In a preferred embodiment the induction heating is carried out in pulses. The length of the pulses will of course depend on the size of the reactor, and the volume of gas and the temperature of the gas passing through the reactor, but usually the pulses will be at least equal to the residence time of the gas in the reaction tube.

BRIEF DESCRIPTION OF THE DRAWING

The drawing is a block diagram of apparatus suitable for carrying out the process of the invention.

DETAILED DESCRIPTION

Induction Heating Apparatus

The apparatus is shown in the FIGURE. The 12 mm diameter quartz tube 1, is placed inside a copper solenoid which generates the necessary alternating magnetic field. The coil is comprised of 8 turns over a height of 6 cm. A separate coupling coil 3, which couples the energy into the main coil is located below the main coil and has 2 turns over a height of 1.5 cm. A capacitor 4, is connected in parallel with the main coil and resonates the coil at the frequency of interest. Flowing water is passed through the coils and around the capacitor for cooling. The power was generated and amplified by commercially available equipment and was transferred to the reactor through 50 ohm cable. Catalyst 6 is located inside of quartz tube 1. Ammonia and hydrocarbon gas are fed through port 7, and the reaction product, HCN and by-products are removed through port 8. The induction heating apparatus is housed in an aluminum enclosure 9.

EXAMPLE

A 5.5 g piece 90% Platinum/10% Rhodium woven gauze was rolled up and placed in the quartz tube reactor inside the induction heating coils. The height of the gauze in the tube was 5.7 cm. Methane and ammonia flows were started in a 1:1 ratio with a total flow of 50 mL/min. The induction power was turned on and the flow rates and power input were varied during about 5 hours of operation. Results with a total feed rate of 50 mL/minute and power input of 245 watts are shown in the following table.

Table Product Composition
1:1 $NH_3$: $CH_4$ feed rate=50 mL/minute, power input=245 watts

TABLE

| | |
|---|---|
| Hydrogen | 72.5 Vol. % |
| Nitrogen | 1.3 Vol. % |
| Methane | 4.4 Vol. % |
| Ammonia | 0.7 Vol. % |
| Hydrogen Cyanide | 21.1 Vol. % |

The selectivity of the reaction to hydrogen cyanide was 88.7%, and the ammonia and methane conversions were >90%.

What is claimed is:

1. A process for the preparation of hydrogen cyanide which consists essentially of providing an electrically nonconductive reaction tube, disposing within the volume of said reaction tube a platinum group-metal catalyst in the form of a metal gauze, said catalyst having an electrical conductivity of at least about 1.0 Siemens per meter, heating said catalyst to a temperature between 600 and 1200° C. by disposing said reaction tube within a solenoid coil and applying to said coil an alternating magnetic field sufficient to cause the solenoid coil to resonate at a frequency determined by the electrical properties of the solenoid coil and a capacitor connected in parallel therewith, and passing a mixture of ammonia vapor and methane through said reaction tube containing said heated catalyst, and recovering hydrogen cyanide.

2. The process of claim 1 in which the hydrocarbon gas is methane, and the mole ratio of methane to ammonia is approximately 1.

3. The process of claim 1 in which the metal of the platinum-group-metal catalyst is platinum.

4. The process of claim 2 in which the platinum-group-metal catalyst is a metal gauze containing at least one platinum-group metal.

* * * * *